Feb. 25, 1964   E. A. EGGENSCHWYLER   3,122,174
REED FOR LOOMS
Filed June 6, 1961

# United States Patent Office 3,122,174
Patented Feb. 25, 1964

3,122,174
REED FOR LOOMS
Eduard A. Eggenschwyler, Seuzach, Zurich, Switzerland, assignor to Ruti Machinery Works Ltd., Ruti, Zurich, Switzerland
Filed June 6, 1961, Ser. No. 115,214
Claims priority, application Switzerland June 15, 1960
2 Claims. (Cl. 139—192)

When a shuttle passes through the shed of a loom, the teeth of the reed are deflected one after another by the shuttle and therefore set into vibration. The frequency of the vibration is determined by the natural frequency of the teeth. The position of the teeth at any instant of time of these vibrations corresponds to an undulating surface, whose period depends both on the natural frequency of the teeth, and also on the speed of the shuttle. These vibrations of the teeth produce so-called chatter-marks on the shuttle i.e. wave-like notches, the course of which corresponds to the aforementioned undulating surface.

A principal object of the present invention is to provide a reed which causes no chatter-marks on the shuttle. The reed according to the invention is principally characterized in that it has teeth with at least two different natural frequencies.

Other features of the invention will appear from the following description and claims, taken in conjunction with the accompanying drawing, wherein there are shown, solely by way of example, three forms of embodiment of the reed and in which:

Figure 1:
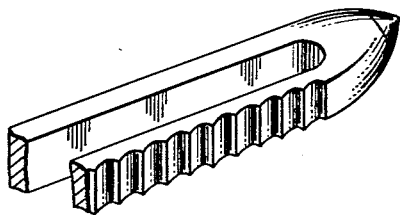
FIG. 1 is a fragmentary perspective view of a shuttle with the chatter-marks hitherto occurring.
Figure 2:
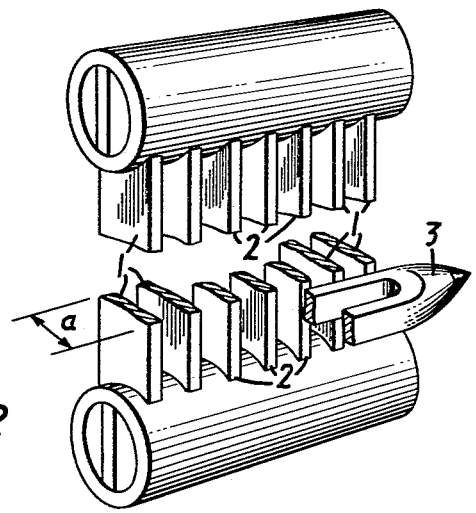
FIG. 2 is a fragmentary perspective view of a shuttle and a perspective view of a reed according to a first embodiment of the invention.

In the first embodiment according to FIG. 2, the reed-teeth 1 and 2 along which the shuttle 3 slides are illustrated fragmentarily. After one set of wider teeth 1, there follows a set of narrower teeth 2. The number of teeth in each set may be chosen as desired. Because of the difference in widths the cross-sectional area of the teeth of the sets is different. Inasmuch as the natural frequency of a tooth depends among other things on its width $a$, with this arrangement the natural frequency of the teeth within one set will be the same, but different in the successive sets, so that no chatter-marks can be produced on the shuttle.

Figure 3:
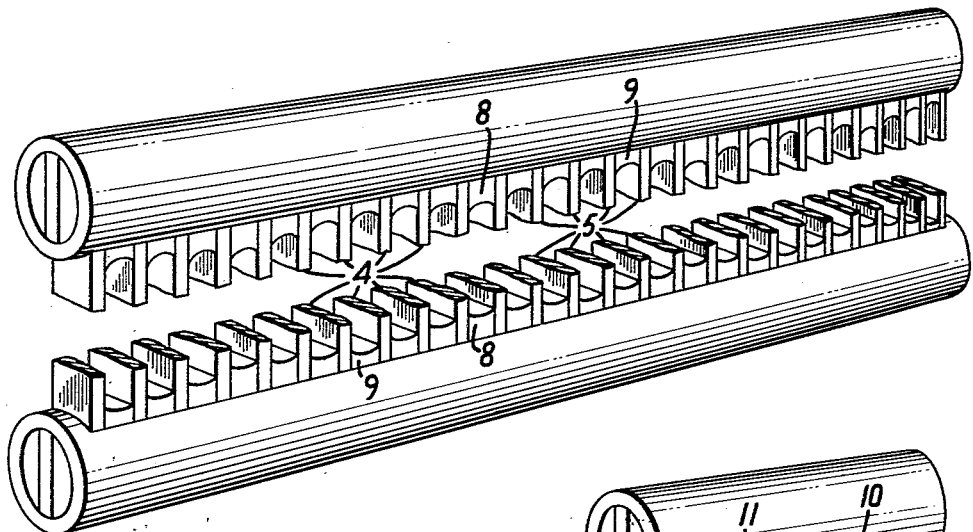
FIG. 3 is a perspective view of a reed according to a second embodiment of the invention.

In the second embodiment of the invention according to FIG. 3, there is shown in perspective view the teeth of a reed divided into several equal sets 4 and 5. Between the teeth, all of which have the same width, there are disposed fillings of soldering tin 8, 9 so that there is, within each set between the several successive teeth, first of all a rather large amount of soldering tin 8, then an always smaller amount and at 9 the smallest amount of soldering tin, after which the amount of soldering tin again increases towards the end of the set. In this way within the several sets the lengths of the teeth between fillings is different and therefore the natural frequencies of the teeth are different, so that also in this case no chatter-marks can form on the shuttle.

Figure 4:
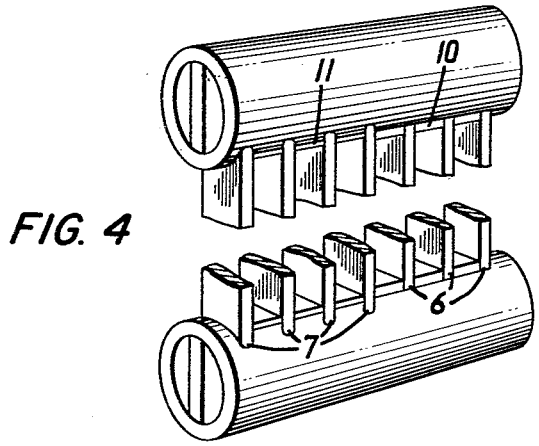
FIG. 4 is a perspective view of a third reed embodying the invention.

In the third embodiment according to FIG. 4, the manner of clamping the teeth 6 and 7 in successive sets of teeth is different, in that for instance the teeth 6 of one set are clamped as usual in fillings 10 of soldering tin, whilst on the other hand the teeth 7 of the neighbouring set are clamped in fillings 11 of rubber. In this way, as in the first embodiment the natural frequency of the teeth within each set is the same, but is different in the successive sets, even if all of the teeth 6 and 7 have the same width and the same clamped length.

Having now particularly described and ascertained the nature of my said invention and in what manner the same is to be performed, I declare that what I claim is:

1. In a loom having in operation a moving shuttle, a weaving reed in said loom comprising, means actuatable by said shuttle and vibratable with different natural frequencies comprising a plurality of teeth in said reed, said plurality of teeth comprising more than two sets of teeth, each set of teeth comprising teeth vibratable at substantially the same frequency when actuated by said shuttle, each set comprising at least two teeth, said sets of teeth comprising a first group of said sets having substantially the same vibrational frequency and another group of sets having substantially the same vibrational frequency which is different than the frequency of said sets of said first group, each group of sets comprising more than two sets of teeth, and the sets of teeth of said first group of teeth being disposed alternately with the teeth of the sets of teeth of said other group, whereby next adjacent sets of teeth vibrate at different frequencies and are prevented from marking said shuttle with chatter marks.

2. In a loom according to claim 1, in which said teeth in said first group have a different cross-sectional area than the teeth of said other group.

References Cited in the file of this patent

UNITED STATES PATENTS

| 502,182 | Fileppi | July 25, 1893 |
| 2,147,257 | Kaufmann | Feb. 14, 1939 |

FOREIGN PATENTS

| 560,269 | France | July 4, 1923 |
| 102,836 | Germany | June 10, 1898 |
| 234,835 | Germany | May 31, 1910 |
| 1,812 | Great Britain | of 1853 |